United States Patent [19]
Smith

[11] 3,979,949

[45] Sept. 14, 1976

[54] FATIGUE DAMAGE INDICATOR

[75] Inventor: Howard Warren Smith, Issaquah, Wash.

[73] Assignee: The Boeing Company, Seattle, Wash.

[22] Filed: June 30, 1975

[21] Appl. No.: 591,915

[52] U.S. Cl. .............................................. 73/88 R
[51] Int. Cl.² ............................................. G01B 5/30
[58] Field of Search .................... 73/88 R, 91, 101; 116/114 AC

[56] References Cited
UNITED STATES PATENTS

| | | | |
|---|---|---|---|
| 2,920,480 | 1/1960 | Haas | 73/88 R |
| 3,136,154 | 6/1964 | Christensen | 73/88 R |
| 3,546,944 | 12/1970 | Mack | 73/88 R |
| 3,774,443 | 11/1973 | Green et al. | 73/88 R |
| 3,918,299 | 11/1975 | Donnadieu | 73/91 |

OTHER PUBLICATIONS
Reuter et al., In–Test Crack–Opening–Displacement Calibration, 1972, Engineering Fracture Mech., vol. 4, pp. 183–188.

*Primary Examiner*—Richard C. Queisser
*Assistant Examiner*—Anthony V. Ciarlante
*Attorney, Agent, or Firm*—Al Richardson; Bernard A. Donahue

[57] ABSTRACT

A gage for measuring accumulated fatigue damage, or accumulated strain experience, and remaining fatigue life in a structure subjected to repeated loadings in relation to predictions or calibration tests. The disclosed embodiment has a thin, nominally rectangular metal base of uniform thickness which has a very narrow crack-like slit cut in one side and a teflon parting strip attached to the base underlying the slit. When the gage is attached to a structure with a suitable adhesive and the structure is subjected to repeated loading, a fatigue crack immediately begins at the inner end of the slit and increases in length as an approximately linear function of the accumulative fatigue damage strains incurred by the structure. The crack in the gage occurs in advance of and independently of any crack in the structure itself.

7 Claims, 3 Drawing Figures

FATIGUE DAMAGE INDICATOR

BACKGROUND OF THE INVENTION

This invention relates generally to materials testing and more particularly to a gage to be used for measuring accumulated fatigue damage in a structure which is subjected to repeated loading.

It has long been recognized that due to the repetitious nature of the loads imposed on structures, many parts of the structure suffer fatigue damage, and that the useful life of these parts is limited by the amount of fatigue damage they can withstand and still retain a reasonable margin of safety. It has long been the practice in the industry to identify parts of the structure thought to be fatigue critical in the design phase and to apply various design techniques to minimize fatigue damage. In addition, such parts are often tested in the laboratory under simulated operating conditions to determine their actual fatigue life.

In recent years it has become common to perform fatigue tests on entire assembled airframes by applying thousands of hours of simulated loads, such as aerodynamic loads, and landing gear loads, known to be repetitive in nature to the airframe. Thorough periodic inspections of the test vehicles are made to pinpoint possible fatigue problems. Using these testing techniques, it is normally possible to uncover potential fatigue problem areas and find the solution considerably before any airplane in actual operation would encounter the same problem.

While these testing methods have been generally quite successful in preventing fatigue failures in actual service, they are not helpful in estimating the accumulated fatigue damage or remaining fatigue life of a particular structural component in a particular airplane in the fleet. These methods are based on the assumption that the life history of all airplanes in the fleet can be fairly represented by a statistical approximation of the number of loads of various magnitudes that will be encountered in service, called a fatigue spectrum, and that the application of a cyclic loading pattern based on this fatigue spectrum to a laboratory specimen will result in an amount of fatigue damage equivalent to that which the same part would suffer in actual service when subjected to random loading.

Since different airplanes in the fleet may operate in vastly different climates and may see different types of service, the first assumption is somewhat questionable. As to the second assumption, it is known that variations in the patterns in which repetitive loads are applied to test specimens have a definite effect on the fatigue life of the specimen. Further, it is known that the environment can have a substantial effect on fatigue life and that it may be quite difficult to duplicate environmental conditions in the laboratory to which certain parts are subjected under actual service.

One solution to these problems which has been suggested by others is to place some sort of a gage or indicator directly on a structural member in actual service which will indicate the accumulated fatigue damage suffered by the member and/or the remaining fatigue life after a given period of service.

Among the devices which have been suggested to provide such information is the one described in U.S. Pat. No. 3,272,003 to D. R. Harting dated Sept. 13, 1966. This patent discloses a gage which utilizes a grid of conductive material in the form of a foil or wire which is to be mounted on the structure in question. When the part is subjected to repetitive loading, the electrical resistance of the gage gradually changes, and this change in resistance can be correlated with fatigue damage by performing laboratory tests on the same part.

Another device for accomplishing this purpose which has been suggested in the prior art is a fatigue monitor described in U.S. Pat. No. 3,136,154 to R. H. Christensen dated June 9, 1964. This gage is in the form of a flat elongated strip of material which is fastened at intervals to the specimen in question by some appropriate means such as an adhesive. In between the fastening points the gage is necked down with a notch on either side of the gage in order that the unfastened portions of the gage will be strained during testing to a greater degree than the specimen itself. Stress rising means, usually in the form of holes of various sizes, are located between the notches. When the specimen is subjected to repetitive loading, various unattached sections of the gage will suffer fatigue failures in some sequence depending upon the maximum stress developed in each section. Then, according to the inventor, it is possible to correlate accumulated fatigue damage in a specimen with the number of sections of the gage which have failed at any particular point in a test sequence.

Another technique suggested for monitoring accumulative fatigue damage in a part in actual service is described in U.S. Pat. No. 2,920,480 to T. Haas dated Jan. 12, 1960. In this patent it is suggested that a number of small identical sensing elements be attached to the specimen in question. Prior to attachment however, the elements are "pre-damaged" by subjecting them to a load spectrum which is "equivalent" to the actual service fatigue spectrum for a period of time such that the remaining fatigue life of each sensing element is equal to the safe life assigned to the part. Then it is assumed that when one of the sensing elements attached to the part in actual service fails, the safe fatigue life of the part has been expended.

Other attempts have been made to measure remaining fatigue life by utilizing ultrasonic devices and investigating the physical changes which occur in the material as a result of fatigue. However, most of these previous methods and devices are unsatisfactory for large scale testing of parts in actual service, either because they involve time consuming and elaborate preparation, extensive amounts of wiring, or produce results which are too inaccurate or difficult to interpret. Current practice, therefore, tends toward the use of some device to measure loads or strains experienced by the airframe and then through the use of certain assumptions to predict the relationship between these measured loads and the resulting fatigue damage.

SUMMARY OF THE INVENTION

In summary, this invention provides for a fatigue damage indicator for measuring accumulated fatigue damage in a structure which indicator has a metalic base, preferably of a thickness which is small in relation to the structural part to be tested, and which base has a very narrow crack-initiating slit therein which normally begins on one edge of the base. The indicator also normally has a strip of parting material which is applied to the base parallel to and overlaying the slit.

One object of this invention is to provide a fatigue damage indicator for measuring the accumulated fatigue damage to a structure to which it has been attached which structure has been subjected to repeated loading.

Another object of this invention is to provide a fatigue damage indicator for measuring the remaining fatigue life in the structure to which it has been attached.

Another object of this invention is to provide a fatigue damage indicator in which a fatigue crack in the indicator grows in length as an approximately linear function of the accumulated fatigue damage incurred by the structure to which the indicator has been attached.

Another object of this invention is to provide a simple and inexpensive fatigue damage indicator which can be applied to numerous points of interest in the structure of a large number of the same type of aircraft, thus making it possible to collect fatigue damage data from each aircraft in an entire fleet.

Another object of this invention is to provide a means for detecting specific cases of deviation from the predicted fatigue spectrum and predicted fatigue damage encountered by a given aircraft in a fleet.

A further object of this invention is to provide a fatigue damage indicator which will exhibit a fatigue crack independently of and in advance of the occurrence of a fatigue crack in the structure to which it has been attached.

DESCRIPTION OF THE PREFERRED EMBODIMENT

Figure 1:
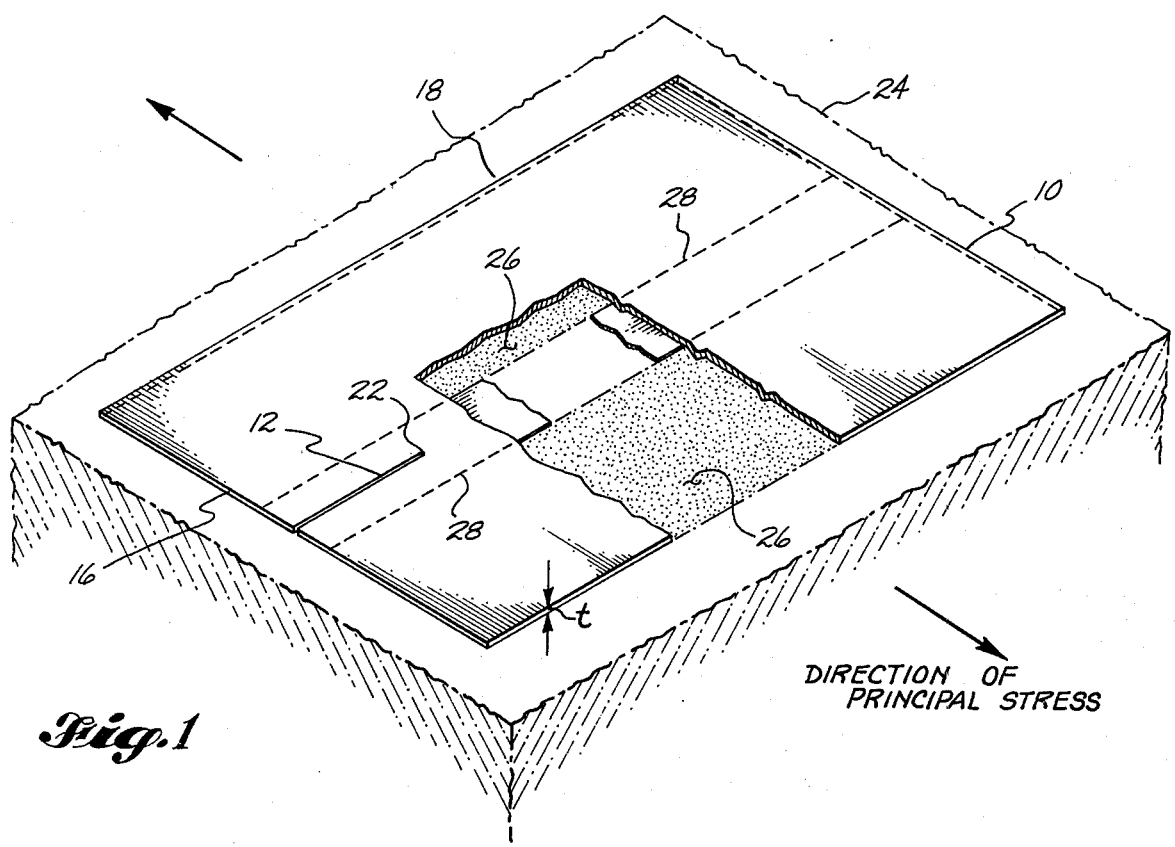
FIG. 1 is a perspective view of an embodiment of this invention with a partially cut-away section.
Figure 2:
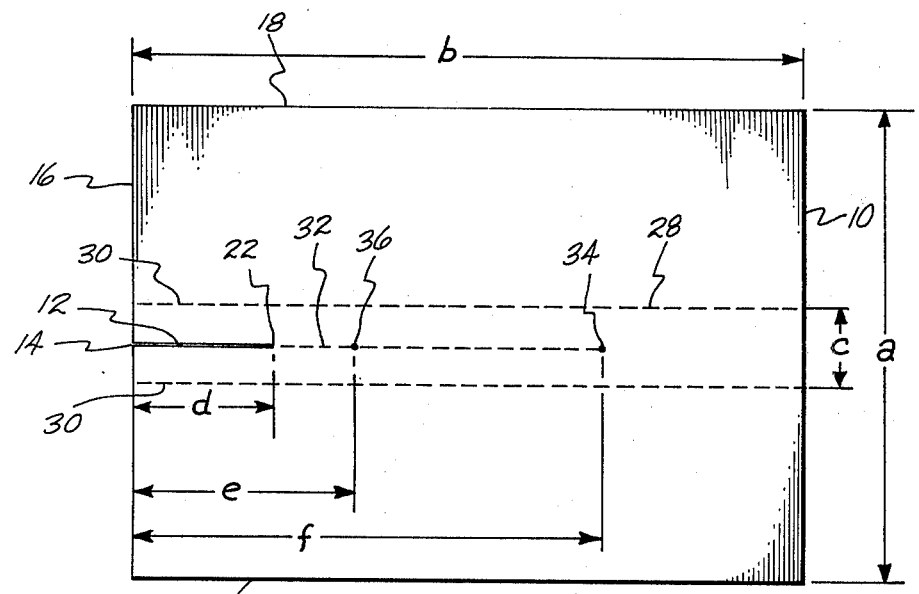
FIG. 2 is a top view of the embodiment.

An embodiment of the fatigue damage indicator is shown in detail in FIGS. 1 and 2. It is seen in these views that the indicator has a metal base 10 which is nominally rectangular when viewed from the top, and has a height $a$, and a width $b$. The height and width of the indicator are not critical to its function and can normally be chosen to suit the geometric requirements of a particular installation. It is not even necessary that the plan form shape of the gage be rectangular; it is only necessary that the gage have a sufficient height to provide an adequate amount of gluing surface (as will be discussed below) and that it have a sufficient length to accommodate the expected amount of crack growth.

The indicator was developed primarily with bases made of aluminum, but the base can be made of practically any metal. It is normally desirable to make the base from a metal having the same or very similar composition to that of the structure to which it is to be attached. When this is done, the environment should have the same effect on the behavior of the indicator as it does on the structure. If dissimilar metals are used, temperature changes may give rise to thermal strains in the indicator which will substantially effect its behavior. Also, intergranular corrosion which occurs between the joining surfaces of dissimilar metals may effect the fatigue properties of both the specimen and the indicator. This is not to say that the indicator cannot be made from a metal different from that of the structure, but only that the use of dissimilar metals may introduce certain complicating factors which must be reproduced in the laboratory in order to obtain useful data.

The particular thickness of metal used in making the indicator depends somewhat on the type of loading to which the structure will be exposed, but in general should be kept as thin as possible. In the embodiment shown, the indicator is made of sheet metal having a uniform thickness $t$ which normally should not exceed 20% of the thickness of the specimen in the locality of the indicator.

During development, typical gages were made of 0.016 inch aluminum sheet, but thicknesses can probably be reduced to as little as one to two mills for certain applications.

If the specimen is expected to undergo compressive loading, the indicator must be made thick enough to prevent buckling. This thickness, of course, can be calculated by assuming the indicator to be a column having a height equal to the width $c$ of the unglued portion (to be discussed below) and having semi-fixed ends. It has been found in actual practice that most members subjected to compressive loadings are themselves rather thick and that a gage of adequate thickness will seldom approach 20% of the specimen thickness.

Referring to FIG. 2, it can be seen that a very thin slit 12 had been cut in base 10 beginning approximately at the midpoint 14 of the left hand side 16 of the base and extending inward a distance $d$ parallel to sides 18 and 20. This slit acts as a stress riser and a load path interrupter within the base, and is sometimes herein referred to as a crack-initiating slit. The crack is intended to simulate a fatigue crack which has naturally occurred in the indicator and is therefore made as narrow and sharp as possible. Any technique which will produce such a slit can be used. Both electron beams and jewelers saws have been found to be satisfactory to produce a reasonably sharp crack. In order to obtain comparable data from a number of identical gage installations, the slits in the gages should be as similar as possible, and an electron beam has been found to be the most satisfactory way of reproducing the slits. Regardless of the method used, it is particularly important that the inner end 22 of the slit be as sharp as possible.

In FIG. 1 the indicator is shown installed on a piece of structure 24 which is to be tested or monitored. For best results the gage would normally be installed with sides 18 and 20, and slit 12 perpendicular to the direction of principal stress (indicated by arrows) in the structure. The indicator is attached to the structure with a film of adhesive 26 which covers the entire undersurface of the base except for the rectangular area covered by the strip of parting material 28. The particular type of adhesive used is unimportant, but it should be chosen to withstand the expected enviromental conditions and provide a relatively rigid bond between the indicator and the structure.

In this embodiment, the parting material is a piece of teflon tape having a length $b$ and a width $c$, and it is attached to the undersurface of the base parallel to the direction of slit 12. Also, the parting strip is normally centered on slit 12 as shown. The purpose of the parting strip is to provide a region of uniform width centered on the slit where the indicator is not attached to the structure and to provide a region in which a crack propagating from end 22 of slit 2 toward the right is free to grow under essentially strain controlled conditions. The particular material used for the strip is unimportant as long as it provides this uniform unadhered region.

In operation, when load is applied to structure 24 a small portion of the load passes through adhesive film 26 into the base of the indicator. Referring to FIG. 2, it can be seen that when the load near the left hand portion of the base reaches the boundaries 30 between the glued and unglued portions of the base, it has a choice of following one of two different load paths. Due to the presence of slit 12, the load cannot pass directly across the base; it must either pass back into structure 24 or must flow around end 22 of slit 12. Since the load will tend to follow the stiffest path available, the direction it takes depends upon how far it is from end 22. It is thought that for distances along boundaries 30 to the left of end 22 greater than $c/2$ (that is, greater than half the width of strip 28) the load tends to flow back into the structure and directly across the unadhered region, whereas for distances significantly less than $c/2$, the load tends to flow around end 22. Accordingly, when the length $d$ of slit 12 is approximately $c/2$ or greater, the flow paths of loads in the unadhered portion of the indicator close to end 22 are roughly constant.

When structure 24 is initially loaded, a stress concentration is formed around end 22, and as a result a fatigue crack is immediately initiated there. As the loading is repeated the crack will propagate to the right along the path approximately by dotted line 32. Normally, a fatigue crack in structure does not begin to propagate immediately upon initiation of loading but begins only after an initial "nucleation period". Under ordinary circumstances, once the crack begins, its length increases in an exponential manner with the number of uniform load cycles to which the specimen has exposed. Because of this nucleation period and the non-linear behavior of normal crack growth, it is difficult to obtain much useful information from normal crack growth per se.

An important aspect of this invention is that when a crack-initiating slit having an initial length of $c/2$ or greater is used, the increase in length of a crack propagating from end 22 thereof is approximately a linear function of the accumulated fatigue damage to which the associated structure 24 has been exposed. That is, any loading pattern or spectrum which causes an equivalent amount of fatigue damage or reduction in the fatigue life of a structure will cause an equivalent amount of crack growth in a fatigue damage indicator attached to that structure.

It has also been found that the rate of crack growth in an indicator is influenced by the width $c$ of parting strip 28. By increasing the width of the strip it is possible to increase the rate of growth of the crack. The width of the strip used depends on the expected fatigue life of the structure and the total crack length desired. As a rule, a gage should be designed to provide a substantial amount of crack growth because it will yield more accurate data. Typically, crack growth of 1 to 2 inches during the fatigue life of a structure has been obtained in laboratory tests.

In order to monitor the accumulative fatigue damage incurred by a piece of structure in actual service, a fatigue damage indicator is first mounted to some part of structure. It can be mounted near where a fatigue failure might be expected, but that is not necessary so long as it is placed where it will be exposed to principal loads in the structure considered primary to fatigue damage. Next, an identical gage is identically located and oriented on an identical piece of structure for laboratory testing. The laboratory specimen is then exposed to repeated loading, but is not necessarily subjected to the same loading spectrum as the part in actual service. When the laboratory specimen fails, the amount of crack growth at the time of failure (indicated by point 34 in FIG. 2) is noted. Then, periodically the amount of crack growth in the structure in actual operation is noted. Now when the crack in the structure of actual service has grown to a point 36, (FIG. 2) it is known that the fraction of its fatigue life expended is equal to the ratio of crack growth in the indicator in actual service to the crack growth at time of failure in the laboratory specimen, or $(e - d)/(f - d)$. Similarly, the fraction of fatigue life remaining is seen to be $(f - e)/(f - d)$.

Figure 3:
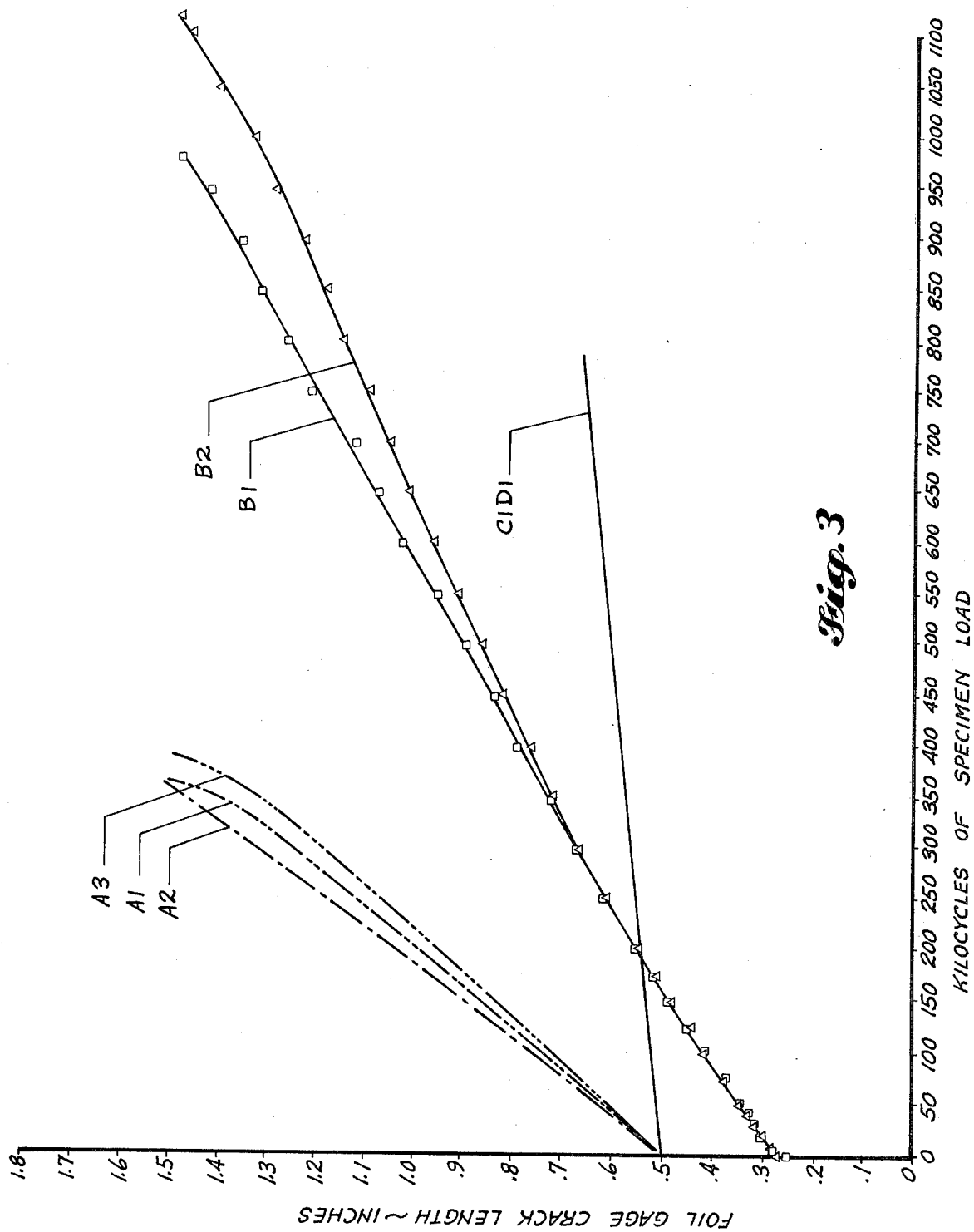
FIG. 3 shows graphically the increase in crack length as a function of number of kilocycles of specimen load for three groups of fatigue damage indicators.

The effect of changing the width $c$ of the parting strip on a given size of indicator is shown graphically in FIG. 3. The data represented by lines A1, A2, and A3 were obtained from three identical gages made of 2024-T3 bare aluminum, each having a width of 1.50 inches, a height of 2.00 inches and a thickness of 0.016 inches. These gages where bonded to a test specimen with B. F. Goodrich "TAME 250" adhesive, and each had a teflon parting strip that was 0.75 inches wide and 2 mills thick. The data for lines B1 and B2 were obtained from gages identical to the "A" gages except that the width of the teflon parting strips was decreased to 0.50 inches and the initial slit length was decreased to approximately 0.25 inches. Note that the decrease in the teflon width caused a decrease in the rate of crack growth in the gages. The data for lines C1D1 were taken from two gages identical to the "A" and "B" gages except that no teflon was used. The result was that although the crack growth retained its linear characteristic, the growth rate was very low compared to the other two groups of gages where a parting strip was used.

It is seen that the above described invention provides for a fatigue damage indicator which permits accurate measurement of the accumulated fatigue damage and the remaining fatigue life of a structure without necessitating the duplication of the operating environment in the laboratory. Due to the simple and inexpensive nature of this gage and its installation requirements, it may now be possible to monitor many or all of a specific type of structure in actual service and thereby facilitate the detection of excessive fatigue damage before unexpected failures occur in service. Further, this indicator provides for the measurement of accumulative fatigue damage utilizing actual fatigue crack growth rather than some corrollary phenomena. Although only one specific embodiment of this invention has been illustrated and described. It is to be understood that obvious modifications may be made of it without departing from the true spirit and scope of this invention.

What is claimed is:

1. A gage for measuring accumulated fatigue damage comprising:

a metalic base of uniform thickness having a crack-initiating slit of length $c/2$ or greater therein; and, a strip of parting material of uniform width $c$ attached to said base and overlaying said slit.

2. A gage for measuring accumulated fatigue damage comprising:

a nominally rectangular metalic base of uniform thickness having a very narrow crack-initiating slit of predetermined length therein; and, a strip of parting material attached to said base, underlaying said slit and having a uniform width no greater than approximately twice the predetermined length of said slit.

3. The gage of claim 2 wherein said parting strip is oriented substantially parallel to the length of said slit.

4. The gage of claim 2 wherein said parting strip is substantially centered on said slit.

5. A method for measuring the accumulated fatigue damage in a structure subjected to repeated stress comprising the steps of:

forming a gage having a metalic base of uniform thickness, which base has a crack-initiating slit of a predetermined length therein, and a strip of parting material having a width no greater than approximately twice the said predetermined length, which strip is attached to said base underlying said slit;

attaching said gage to said structure such that the length of said slit is oriented approximately perpendicular to the direction of principal stress in the structure;

exposing said structure to repeated stressing;

measuring the length of the slit; and, comparing the said measured length to length of the slit in a substantially identical gage in a substantially identical location on a substantially identical structure which has been fatigue tested to failure.

6. A method for measuring the remaining fatigue life in a structure subjected to repeated stress comprising the steps of:

forming a gage having a metalic base of uniform thickness, which base has a crack-initiating slit of a predetermined length therein, and a strip of parting material having a width no greater than approximately twice the said predetermined length, which strip is attached to said base underlaying said slit;

attaching said gage to said structure such that the length of said slit is oriented approximately perpendicular to the direction of principal stress in the structure;

exposing said structure to repeated stressing;

measuring the length of the slit; and, comparing the said measured length to length of the slit in a substantially identical gage in a substantially identical location on a substantially identical structure which has been fatigue tested to failure.

7. A method for measuring accumulated fatigue damage and remaining fatigue life in a structure exposed to repeated stress comprising the steps of:

forming a gage having a metalic base of uniform thickness which base has a crack-initiating slit of a predetermined length therein;

attaching said gage to said structure but leaving unadhered a portion of said base, said portion containing said slit and having a uniform width no greater than approximately twice the said predetermined length of said slit, said gage being oriented such that the length of said slit is approximately perpendicular to the direction of principal stress in the structure;

exposing said structure to repeated stressing;

measuring the length of the slit; and comparing the said measured length to length of the slit in a substantially identical gage in a substantially identical location on a substantially identical structure which has been fatigue tested to failure.

* * * * *